Dec. 15, 1931.  K. A. QUER  1,836,870
EDUCATIONAL GAME FOR TEACHING ARITHMETIC
Filed April 10, 1930
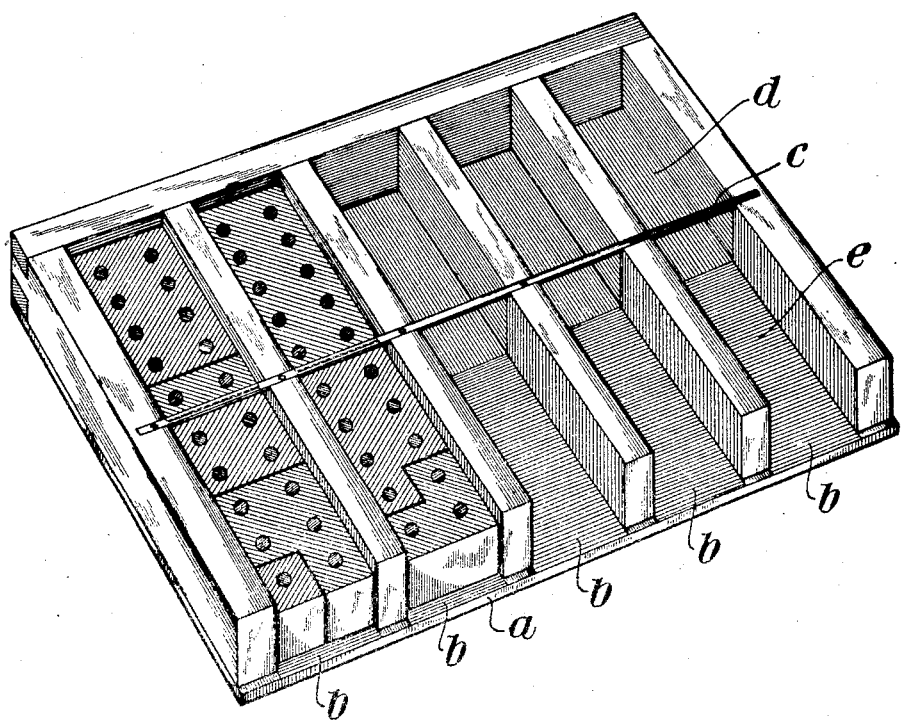
K. A. Quer INVENTOR
By: Marks Clem
Attys.

Patented Dec. 15, 1931

1,836,870

UNITED STATES PATENT OFFICE

KARL AUGUST QUER, OF KASSEL, GERMANY

EDUCATIONAL GAME FOR TEACHING ARITHMETIC

Application filed April 10, 1930, Serial No. 443,127, and in Germany September 3, 1928.

The invention relates to an educational game, for teaching arithmetic, characterized by the combination of the following parts.

(a) A number of blocks of different sizes, provided with sets of numerical representations consisting of spots, the blocks bearing even numbers being rectangular, whilst those bearing odd numbers except one are cut away stepwise on one of the longer sides;

(b) A base board on which the blocks are laid, said board being divided into parallel compartments of the same width as the blocks;

(c) A strip, or the like, disposed on the base board at right angles to the longitudinal direction of the compartments, and dividing them into two parts.

The base board is provided with (preferably five) compartments, which are open at one end, are twice as long as a block provided with ten spots, and are coloured differently on opposite sides of the aforesaid strip dividing them in half.

As can be seen from the accompanying drawing, which illustrates a typical embodiment, the base board a displays five compartments, the halves of which are denoted by d and e respectively. The length of each compartment is double that of a block arranged to form a ten-spot unit. The compartments are divided into halves by means of a strip c, disposed above them, and are of different colours on each side of said strip, those marked d being, for example, white, whilst those marked e are green. Moreover, by using several differently coloured base boards, the values of high numbers can be easily explained. Up to "100", the numbers can easily be made up of units and tens blocks, whilst, for sums higher than 100, each filled board represents 100.

Moreover, the blocks and the board a enable the categories of the fundamental kinds of arithmetical calculation to be understood, a point of importance being that this is effected through the manipulations performed by the pupils themselves.

In the work of addition, the totals can be made up of differently coloured blocks (numerical pictures), either on the board a itself, or apart therefrom. In subtraction, the total can be assembled in such a way that the numbers representing the results are shewn by a particular colour. In multiplication, a multiple of one, two, three or more times the given number can be taken, and assembled either on or outside the board. In division, or stating how many times one number will go into another, the number to be divided is assembled from factors.

Carrying over the "tens" no longer presents the known difficulties, being made quite clear to the pupil by means of the "tens" strip c disposed on the board, which segregates, in an intelligible manner, the item extending beyond the next 10.

By colouring the blocks differently on two sides, the multiple as well as the sum of two items can also be easily revealed. Thus, for example, "6" can be represented at one time as a unit, by a red or yellow block, and also by a block with one red spot and a block with five yellow spots. It may also be represented by a block with two red spots and another with three yellow spots may also be used. Again, the combination with four red and two yellow spots, and finally with five red spots and one yellow, enables the number to be represented.

For the use of the blind, the spots composing the numerical pictures may be recessed, so that their value can be ascertained by touch. In such case, the different colouring of the two sides is replaced by making the one smooth and the other rough.

I claim:

An educational game for teaching arithmetic comprising the combination of blocks of different sizes bearing numerical representations of values from one to ten, the blocks bearing even numbers being of uniform width throughout their length and those bearing odd numbers being at least partly of less width than the first mentioned blocks, a base board on which the blocks can be laid, said board having five parallel compartments of equal length and open at one end, said compartments being twice as long as a block, representing the ten value and a strip dividing each compartment transversely into two parts, the several blocks being capable of interfitting end to end with each other in groups having individual numerical values of less than ten and a total numerical value of ten to completely occupy the parts of the compartments, the parts of the compartments being dimensioned to snugly accommodate groups of blocks totalling ten in numerical value.

In testimony whereof I affix my signature.

KARL AUGUST QUER.